United States Patent [19]

Phaal et al.

[11] Patent Number: 4,875,907
[45] Date of Patent: Oct. 24, 1989

[54] THERMALLY STABLE DIAMOND ABRASIVE COMPACT BODY

[76] Inventors: Cornelius Phaal, Glade Cottage, St. Anne's Glade, Bagshot, Surrey, GU195EF, England; Richard P. Burnand, 39 Constantia Ave., Alan Manor, Johannesburg, Transvaal, South Africa

[21] Appl. No.: 100,113

[22] Filed: Sep. 23, 1987

[30] Foreign Application Priority Data

Sep. 24, 1986 [ZA] South Africa ................ 86/7280

[51] Int. Cl.⁴ .............................................. B24D 3/02
[52] U.S. Cl. .................................... 51/293; 51/309
[58] Field of Search .................................. 51/293, 309

[56] References Cited

U.S. PATENT DOCUMENTS

| | | | |
|---|---|---|---|
| 4,225,322 | 9/1980 | Knemeyer | 51/309 |
| 4,311,490 | 1/1982 | Bovenkerk et al. | 51/309 |
| 4,496,372 | 1/1985 | Almond et al. | 51/309 |
| 4,505,721 | 3/1985 | Almone et al. | 51/309 |
| 4,534,773 | 8/1985 | Phaal et al. | 51/293 |
| 4,686,080 | 8/1987 | Hara et al. | 51/309 |

*Primary Examiner*—Paul Lieberman
*Assistant Examiner*—Willie J. Thompson
*Attorney, Agent, or Firm*—Scully, Scott, Murphy & Presser

[57] ABSTRACT

A thermally stable diamond compact is bonded to a cemented carbide substrate through a nickel bonding layer. Bonding takes place under elevated conditions of temperature and pressure where the temperature is at least 1000° C. and the pressure is at least 30 kilobars.

4 Claims, 1 Drawing Sheet

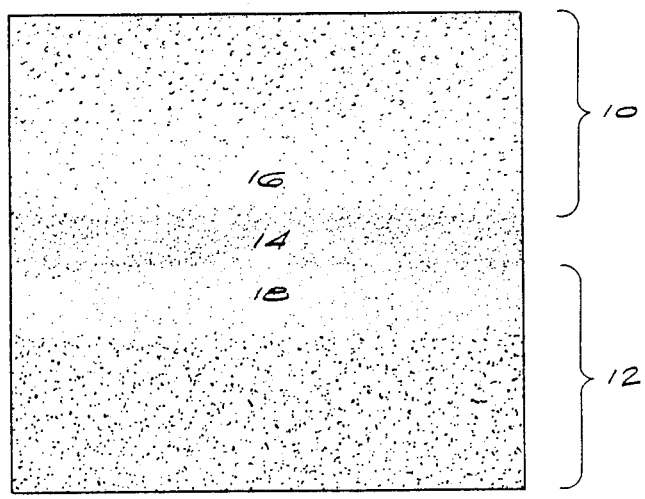

THERMALLY STABLE DIAMOND ABRASIVE COMPACT BODY

BACKGROUND OF THE INVENTION

This invention relates to a thermally stable diamond abrasive compact body.

Diamond abrasive compacts are well known in the art and consist essentially of a mass of diamond abrasive particles present in an amount of at least 70 percent, preferably 80 to 90 percent, by volume of the compact bonded into a hard conglomerate. Compacts are polycrystalline masses and can replace single large crystals in many applications Diamond compacts will typically contain a second phase uniformly distributed through the diamond mass. The second phase may contain a dominant amount of a catalyst/solvent for diamond synthesis such as cobalt, nickel or iron. Diamond compacts having second phases of this nature will generally not have thermal stability above 700° C.

Diamond abrasive compacts may be used alone or as composite compacts in which event they are backed with a cemented carbide substrate. Composite diamond abrasive compacts wherein the second phase contains a diamond catalyst/solvent are widely used in industry.

Examples of composite diamond abrasive compacts are described in U.S. Pat. No. 3,745,623 and British Patent Specification No. 1,489,130.

Diamond abrasive compacts of the type described above are thermally sensitive above a temperature of about 700° C. There are, however, described in the literature and in commercial use several diamond abrasive compacts which are thermally stable above 700° C. For example, U.S. Pat. No. 4,224,380 describes a thermally stable diamond compact which comprises self-bonded diamond particles comprising between about 70% and 95% by volume of the product, a metallic phase infiltrated substantially uniformly throughout the product, the phase comprising between about 0.05% and 3% by volume of the product and a network of interconnected, empty pores dispersed throughout the product and defined by the particles and the metallic phase, the pores comprising between 5% and 30% by volume of the product.

U.S. Pat. No. 4,534,773 describes a thermally stable diamond abrasive compact which comprises a mass of diamond particles present in an amount of 80 to 90% by volume of the body and a second phase present in an amount of 10 to 20% by volume of the body, the mass of diamond particles containing substantial diamond-to-diamond bonding to form a coherent, skeletal mass and the second phase containing nickel and silicon, the nickel being in the form of nickel and/or nickel silicide and the silicon being in the form of silicon, silicon carbide and/or nickel silicide.

British Patent Publication No. 2158086 describes a thermally stable diamond abrasive compact similar to that described in U.S. Pat. No. 4,534,773 save that the second phase consists essentially of silicon in the form of silicon carbide and/or silicon.

Difficulty has been experienced in the past in producing a composite diamond abrasive compact or carbide supported wire-drawing die wherein the diamond compact is a thermally stable one of the type described above. To the best of the Applicant's knowledge, no such products are as yet commercially available.

SUMMARY OF THE INVENTION

According to the invention there is provided a method of making a composite diamond abrasive compact comprising a thermally stable diamond compact bonded to a cemented carbide substrate including the steps of forming an unbonded assembly comprising a thermally stable diamond compact comprising a mass of diamond particles containing substantial diamond-to-diamond bonding to form a coherent, skeletal mass and a second phase uniformly distributed through the diamond mass, a cemented carbide substrate and a layer of nickel or a nickel-rich alloy between the compact and substrate, placing the unbonded assembly in the reaction zone of a high pressure/hightemperature apparatus, subjecting the unbonded assembly to a temperature of at least 1000° C. and simultaneously a pressure of at least 30 kilobars for a time sufficient to cause bonding to occur between the compact and substrate and removing the composite diamond abrasive compact from the reaction zone.

DESCRIPTION OF THE DRAWING

The drawing illustrates a sectional side view of the interfacial zone between compact and carbide substrate produced by the method of the invention.

DETAILED DESCRIPTION OF THE INVENTION

The method of the invention, it has been found, achieves a strong bond between the thermally stable diamond compact and the cemented carbide substrate. Indeed, push-off strengths exceeding 300 MPa can be achieved. Moreover, it has been found that this push-off strength is not adversely affected even when the bond is subjected to a temperature as high as 950° to 1000° C. as happens if the composite compact is brazed to a support using a commercial high temperature braze.

The thermally stable diamond compact must have a second phase which is uniformly distributed through the bonded diamond mass. Examples of suitable second phases are silicon, silicon/nickel, silicon/cobalt and nickel/chromium. In all these second phases, the metal will be elemental or combined form. Examples of particularly suitable thermally stable diamond compacts are those described in U.S. Pat. No. 4,534,773 and British Patent Publication No. 2158086.

The cemented carbide substrate may be any known in the art such as cemented tungsten carbide, cemented tantalum carbide, cemented titanium carbide and mixtures thereof. The preferred cemented carbide is cemented tungsten carbide.

Examples of suitable nickel-rich alloys are those which contain nickel and up to 10% by weight of a metal selected from titanium, zirconium, tantalum and molybdenum.

The thickness of the metal layer in the bonded composite abrasive compact will generally be thin and not exceed 100 microns in thickness.

The bonding takes place in a conventional high temperature/highpressure apparatus which is well known in the art. The elevated temperature which is applied will preferably be in the range 1000° C. to 2000° C. The pressure which will be applied must be sufficient to inhibit degradation of diamond in the compact at the applied pressure and will typically be in the range 30 to 55 kilobars.

The elevated temperature and pressure conditions will be maintained for a time sufficient to cause bonding to occur between the compact and substrate. Typically, the elevated temperature and pressure conditions will be maintained for a period of at least 10 minutes. It has been found that nickel from the metal layer infiltrates into the thermally stable diamond compact during bonding. It has been further found that this infiltration should be limited to less than about 600 microns in depth to ensure that the compact retains its strength and thermal stability and effective bonding is achieved.

The diamond compact will be thermally stable in the sense that it will withstand a temperature of 1200° C. in a vacuum of $10^4$ Torr or better or in an inert or reducing atmosphere without significant graphitisation of the diamond occurring.

The diamonds for the compact may be natural or synthethic.

An example of the invention will not be described. A thermally stable diamond abrasive compact was made in the manner described in British Patent Publication No. 2158086. This thermally stable abrasive compact consisted of a mass of diamond particles present in an amount of 85% by volume of the compact, and a second phase present in an amount of 15% by volume of the body, the mass of diamond particles containing substantial diamond-to-diamond bonding to form a coherent, skeletal mass and the second phase containing silicon in the form of silicon and/or silicon carbide.

An unbonded assembly was made by sandwiching a nickel foil of thickness 100 microns between the thermally stable diamond abrasive compact and a cemented tungsten carbide substrate. This unbonded assembly was placed in the reaction capsule of a conventional high temperature/high pressure apparatus which was then placed in the reaction zone of this apparatus. The pressure was raised to 35 kilobars and the temperature thereafter raised to 1100° C. These conditions were maintained for a period of 15 minutes. Recovered from the reaction capsule was a composite diamond abrasive compact comprising the thermally stable diamond abrasive compact bonded to the cemented carbide substrate through a nickel bonding layer.

The attached drawing illustrates a sectional side view of the interfacial region of the composite compact. Referring to this drawing, the diamond compact 10 is bonded to the cemented carbide substrate 12 through a nickel bonding layer 14. The nickel bonding layer 14 infiltrated into both the diamond compact 10 and into the cemented carbide substrate 12. The penetration of the nickel into the compact is designated by the region 16 and extended to a depth of about 500 microns. It was found that the nickel in this zone consisted largely of nickel silicide. The nickel infiltrated to a lesser extent into the cemented carbide substrate and this is shown by the zone 18. The depth of the zone 18 was of the order of 50 microns.

The bond strength between compact and substrate was extremely high showing an average push-off strength of the order of 345 MPa. This push-off strength was not adversely affected by subjecting the bonded product to a temperature of 990° C. when it was brazed using a commercial braze to a cemented carbide pin. The abrasion resistance of the compact was extremely high when subjected to a turning test on Paarl granite. This good abrasion resistance was particularly apparent at cutting speeds exceeding 200 m/min at which speeds high temperatures are generated in the cutting zone.

We claim:

1. A method of making a composite diamond abrasive compact comprising a thermally stable diamond compact bonded to a cemented carbide substrate including the steps of forming an unbonded assembly comprising a thermally stable diamond compact comprising a mass of diamond particles containing substantial diamond-to-diamond bonding to form a coherent, skeletal mass and a second phase uniformly distributed through the diamond mass, a cemented carbide substrate and a layer of nickel or a nickel-rich alloy between the compact and substrate, placing the unbonded assembly in the reaction zone of a high pressure/high temperature apparatus, subjecting the unbonded assembly to a temperature of at least 1000° C. and simultaneously a pressure of at least 30 kilobars for a time sufficient to cause bonding to occur between the compact and substrate and removing the composite diamond abrasive compact from the reaction zone.

2. A method according to claim 1 wherein the temperature applied does not exceed 2000° C. and the pressure applied does not exceed 55 kilobars.

3. A method according to claim 1 wherein the alloy contains nickel and up to 10% by weight of a metal selected from titanium, zirconium, tantalum and molybdenum.

4. A method of claim 1 wherein nickel from the layer infiltrates into the compact and the conditions of temperature and pressure applied are such that the penetration does not exceed a depth of 600 microns.

* * * * *